United States Patent
Matsushita

(10) Patent No.: US 11,874,180 B2
(45) Date of Patent: Jan. 16, 2024

(54) CERAMIC HEATER

(71) Applicant: NGK INSULATORS, LTD., Nagoya (JP)

(72) Inventor: Ryohei Matsushita, Yokkaichi (JP)

(73) Assignee: NGK INSULATORS, LTD., Nagoya (JP)

( * ) Notice: Subject to any disclaimer, the term of this patent is extended or adjusted under 35 U.S.C. 154(b) by 427 days.

(21) Appl. No.: 17/115,970

(22) Filed: Dec. 9, 2020

(65) Prior Publication Data

US 2021/0239541 A1  Aug. 5, 2021

(30) Foreign Application Priority Data

Feb. 3, 2020 (JP) .................................. 2020-016112

(51) Int. Cl.
*G01K 7/02* (2021.01)
*H05B 3/02* (2006.01)
(Continued)

(52) U.S. Cl.
CPC ................. *G01K 7/02* (2013.01); *H05B 3/02* (2013.01); *H05B 3/283* (2013.01); *H05B 3/74* (2013.01); *H05B 2203/005* (2013.01)

(58) Field of Classification Search
CPC . G01K 7/02; H05B 3/02; H05B 3/283; H05B 3/74; H05B 2203/005
See application file for complete search history.

(56) References Cited

U.S. PATENT DOCUMENTS

2012/0018416 A1   1/2012  Goto
2012/0211933 A1*  8/2012  Goto ................. H01L 21/68757
                                                         269/293

(Continued)

FOREIGN PATENT DOCUMENTS

CN   102598212 A   7/2012
CN   109314076 A   2/2019
(Continued)

OTHER PUBLICATIONS

Korean Office Action (Application No. 10-2021-0011320) dated Jul. 11, 2022 (with English translation).

(Continued)

*Primary Examiner* — Nathaniel E Wiehe
*Assistant Examiner* — Theodore J Evangelista
(74) *Attorney, Agent, or Firm* — BURR PATENT LAW, PLLC

(57) ABSTRACT

A ceramic heater includes a ceramic plate having a surface that serves as a wafer placement surface, resistance heating elements that are embedded in the ceramic plate, a tubular shaft that supports the ceramic plate from a rear surface of the ceramic plate, and a thermocouple passage that extends from a start point in a within-shaft region of the rear surface of the ceramic plate, the within-shaft region being surrounded by the tubular shaft, to a terminal end position in an outer peripheral portion of the ceramic plate. The thermocouple passage includes a stepped portion formed at an intermediate position between the start point and the terminal end position, a long-distance portion extending from the start position to the terminal end position, and a short-distance portion extending from the start position to the intermediate position.

13 Claims, 13 Drawing Sheets

(51) Int. Cl.
  *H05B 3/74*  (2006.01)
  *H05B 3/28*  (2006.01)

(56) References Cited

U.S. PATENT DOCUMENTS

| | | | |
|---|---|---|---|
| 2014/0014642 A1 | 1/2014 | Elliot et al. | |
| 2017/0303338 A1 | 10/2017 | Parkhe | |
| 2018/0122659 A1* | 5/2018 | Tsuchida | H01L 21/67248 |
| 2018/0277352 A1* | 9/2018 | Elliot | H01L 21/67248 |

FOREIGN PATENT DOCUMENTS

| | | |
|---|---|---|
| JP | 2009-074978 A1 | 4/2009 |
| JP | 2012-160368 A | 8/2012 |
| JP | 2018-074009 A | 5/2018 |
| KR | 10-2018-0128074 A | 11/2018 |
| WO | 2012/039453 A1 | 3/2012 |

OTHER PUBLICATIONS

Taiwanese Office Action (Application No. 109146174) dated Nov. 19, 2021.
Japanese Office Action (Application No. 2020-016112) dated Aug. 23, 2022 (with English translation).
Chinese Office Action, Chinese Application No. 202110146229, dated Nov. 23, 2023 (10 pages).

* cited by examiner

CERAMIC HEATER

BACKGROUND OF THE INVENTION

1. Field of the Invention

The present invention relates to a ceramic heater.

2. Description of the Related Art

As one type of ceramic heater, there has hitherto been known the so-called two-zone heater in which resistance heating elements are embedded independently of each other in an inner peripheral side and an outer peripheral side of a disk-shaped ceramic plate having a wafer placement surface. For example, Patent Literature (PTL) 1 discloses a ceramic heater 410 illustrated in FIG. 19. In the ceramic heater 410, a temperature in an outer peripheral side of a ceramic plate 420 is measured by an outer-peripheral-side thermocouple 450. A thermocouple guide 432 extends straight through the inside of a tubular shaft 440 from a lower side toward an upper side and is then bent in an arch shape to turn 90°. The thermocouple guide 432 is attached to a slit 426a that is formed in a region of a rear surface of the ceramic plate 420, the region being surrounded by the tubular shaft 440. The slit 426a serves as an inlet portion of a thermocouple passage 426. The outer-peripheral-side thermocouple 450 is inserted into a tube of the thermocouple guide 432 and extends up to a terminal end position of the thermocouple passage 426.

CITATION LIST

Patent Literature

PTL 1: WO 2012/039453 A1 (FIG. 11)

SUMMARY OF THE INVENTION

However, because the thermocouple passage 426 extends straight in one direction, the thermocouple inserted into the thermocouple passage 426 basically measures a temperature at the terminal end position of the thermocouple passage 426. Thus there is no freedom in position of the temperature measurement. If a temperature measurement portion (tip end) of the thermocouple is held at a location before reaching the terminal end position of the thermocouple passage 426, the temperature measurement can be performed at that location. In such a case, however, the accuracy of the temperature measurement reduces because a temperature of air around the temperature measurement portion is measured.

The present invention has been made with intent to solve the above-mentioned problem, and a main object of the present invention is to increase a degree of freedom in position of temperature measurement and to improve the accuracy of the temperature measurement at each position of the temperature measurement.

A ceramic heater according to a first aspect of the present invention includes:
- a ceramic plate having a surface that serves as a wafer placement surface;
- a resistance heating element that is embedded in the ceramic plate;
- a tubular shaft that supports the ceramic plate from a rear surface of the ceramic plate; and
- a thermocouple passage that extends from a start point in a within-shaft region of the rear surface of the ceramic plate, the within-shaft region being surrounded by the tubular shaft, to a terminal end position in an outer peripheral portion of the ceramic plate, wherein the thermocouple passage includes a stepped portion provided at an intermediate position between the start point and the terminal end position, a long-distance portion extending from the start position to the terminal end position, and a short-distance portion extending from the start position to the intermediate position.

According to the above-described ceramic heater, the thermocouple passage includes the stepped portion provided at the intermediate position between the start point and the terminal end position, the long-distance portion extending from the start position to the terminal end position, and the short-distance portion extending from the start position to the intermediate position. Therefore, a temperature at the terminal end position can be accurately measured by inserting a thermocouple into the long-distance portion and arranging a temperature measurement portion of the thermocouple to be held in contact with the terminal end position. Moreover, a temperature at the intermediate position can be accurately measured by inserting the thermocouple into the short-distance portion and arranging the temperature measurement portion of the thermocouple to be held in contact with the stepped portion at the intermediate position. As a result, a degree of freedom in position of the temperature measurement can be increased, and the accuracy of the temperature measurement at each position of the temperature measurement can be improved.

The intermediate position may be set to any suitable location between the start point and the terminal end position. Furthermore, a plurality of intermediate positions may be set between the start point and the terminal end position, and the stepped portion may be provided at each of the plurality of intermediate positions.

In the ceramic heater according to the first aspect of the present invention, the stepped portion may be provided as a step formed to lie in a planar direction of the ceramic plate. With this feature, the temperature measurement portion of the thermocouple can be brought into contact with one of the terminal end position and the stepped portion at the intermediate position by inserting the thermocouple along one side surface of the thermocouple passage. The temperature measurement portion of the thermocouple can be brought into contact with the other of the terminal end position and the stepped portion at the intermediate position by inserting the thermocouple along the other side surface of the thermocouple passage.

In the ceramic heater according to the first aspect of the present invention, the stepped portion may be provided as a step formed to lie in a thickness direction of the ceramic plate. With this feature, the temperature measurement portion of the thermocouple can be brought into contact with one of the terminal end position and the stepped portion at the intermediate position by inserting the thermocouple along an upper step surface of the thermocouple passage. The temperature measurement portion of the thermocouple can be brought into contact with the other of the terminal end position and the stepped portion at the intermediate position by inserting the thermocouple along a lower step surface of the thermocouple passage.

In the ceramic heater according to the first aspect of the present invention, the thermocouple passage may include a partition wall that is provided in at least part of a boundary between the long-distance portion and the short-distance portion. With this feature, the thermocouple inserted into the long-distance portion (or the short-distance portion) can be prevented from accidentally coming to the short-distance portion (or the long-distance portion).

In the ceramic heater according to the first aspect of the present invention, the thermocouple passage may be curved when viewing the ceramic plate in plan. With this feature, when an obstacle, such as a through-hole, is present in the ceramic plate, the thermocouple passage can be formed while avoiding the obstacle.

In the ceramic heater according to the first aspect of the present invention, the resistance heating element may be wired for each of a plurality of zones that are obtained by dividing the wafer placement surface, and the terminal end position and the intermediate position may be located in different ones of the plurality of zones. With this feature, in the so-called multi-zone heater, temperatures in the different zones can be accurately measured.

A ceramic heater according to a second aspect of the present invention includes:
  a ceramic plate having a surface that serves as a wafer placement surface;
  a resistance heating element that is embedded in the ceramic plate;
  a tubular shaft that supports the ceramic plate from a rear surface of the ceramic plate; and
  a thermocouple passage that extends from a start point in a within-shaft region of the rear surface of the ceramic plate, the within-shaft region being surrounded by the tubular shaft, toward an outer peripheral portion of the ceramic plate,
  wherein the thermocouple passage includes a branch point at a midway position, a first branch passage extending from the branch point to a first terminal end position, and a second branch passage extending from the branch point to a second terminal end position that is different from the first terminal end position.

According to the above-described ceramic heater, the thermocouple passage includes the branch point at the midway position, the first branch passage extending from the branch point to the first terminal end position, and the second branch passage extending from the branch point to the second terminal end position that is different from the first terminal end position. Therefore, a temperature at the first terminal end position can be accurately measured by inserting the thermocouple into the first branch passage and arranging the temperature measurement portion of the thermocouple to be brought into contact with the first terminal end position. Furthermore, a temperature at the second terminal end position can be accurately measured by inserting the thermocouple into the second branch passage and arranging the temperature measurement portion of the thermocouple to be brought into contact with the second terminal end position. As a result, a degree of freedom in position of temperature measurement can be increased, and the accuracy of the temperature measurement at each position of the temperature measurement can be improved.

In the ceramic heater according to the second aspect of the present invention, a length from a center of the ceramic plate to the second terminal end position may be equal to or different from a length from the center of the ceramic plate to the first terminal end position. When both the lengths are set equal to each other, temperatures at two points with the same distance from the center of the ceramic plate can be measured. When both the lengths are set different from each other, temperatures at two points with different distances from the center of the ceramic plate can be measured.

In the ceramic heater according to the second aspect of the present invention, the thermocouple passage may include a partition wall that is provided in at least part of the thermocouple passage between the start point and the branch point. With this feature, the thermocouple can be guided to the first terminal end position or the second terminal end position with the aid of the partition wall.

In the ceramic heater according to the second aspect of the present invention, at least one of the first branch passage and the second branch passage of the thermocouple passage may be curved when viewing the ceramic plate in plan. With this feature, when an obstacle, such as a through-hole, is present in the ceramic plate, the thermocouple passage can be formed while avoiding the obstacle.

In the ceramic heater according to the second aspect of the present invention, the resistance heating element may be wired for each of a plurality of zones that are obtained by dividing the wafer placement surface, and the first terminal end position and the second terminal end position may be located in different ones of the plurality of zones. With this feature, in the so-called multi-zone heater, temperatures in the different zones can be accurately measured.

DETAILED DESCRIPTION OF THE INVENTION

Figure 1:
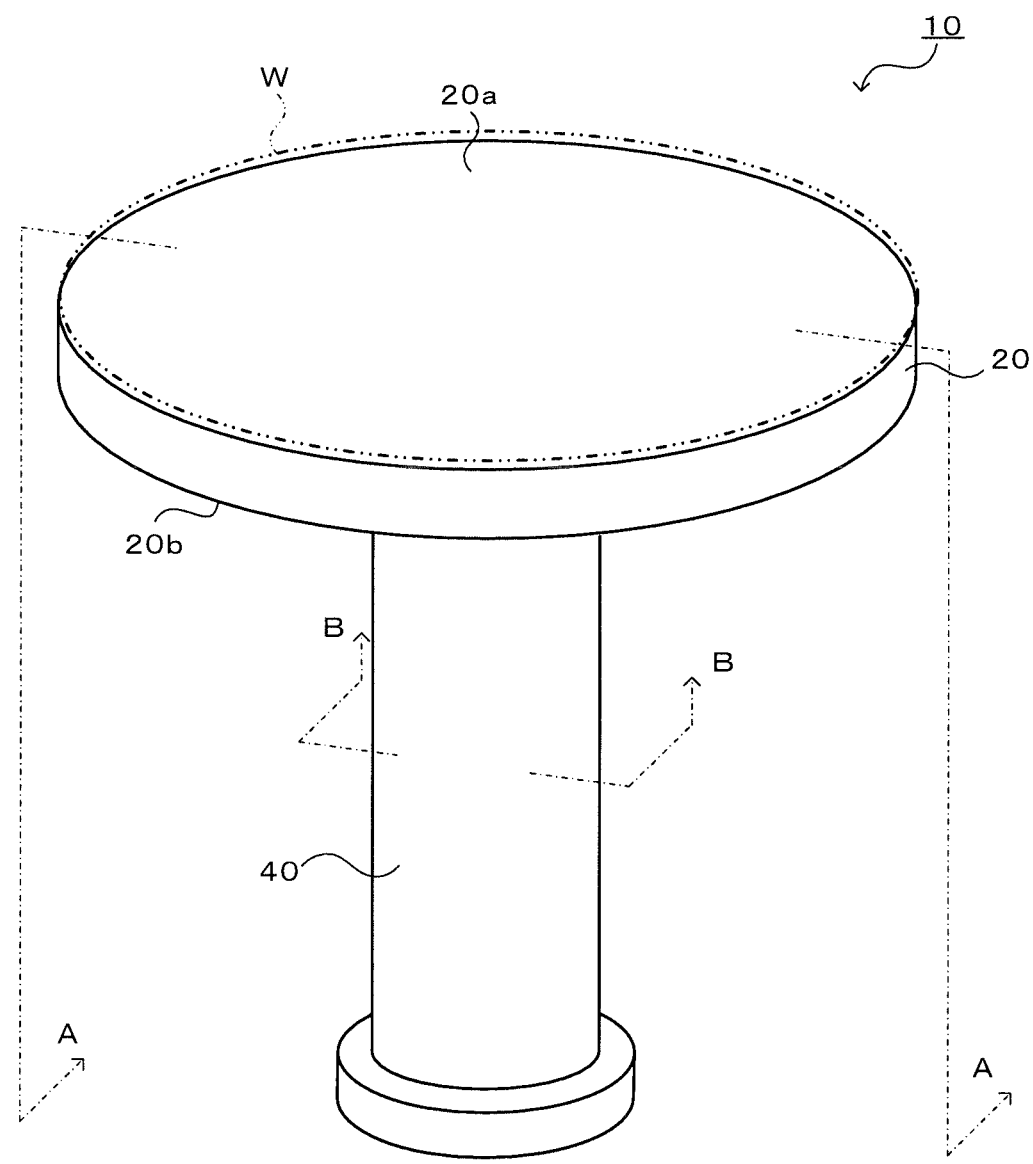
FIG. 1 is a perspective view of a ceramic heater 10.
Figure 2:
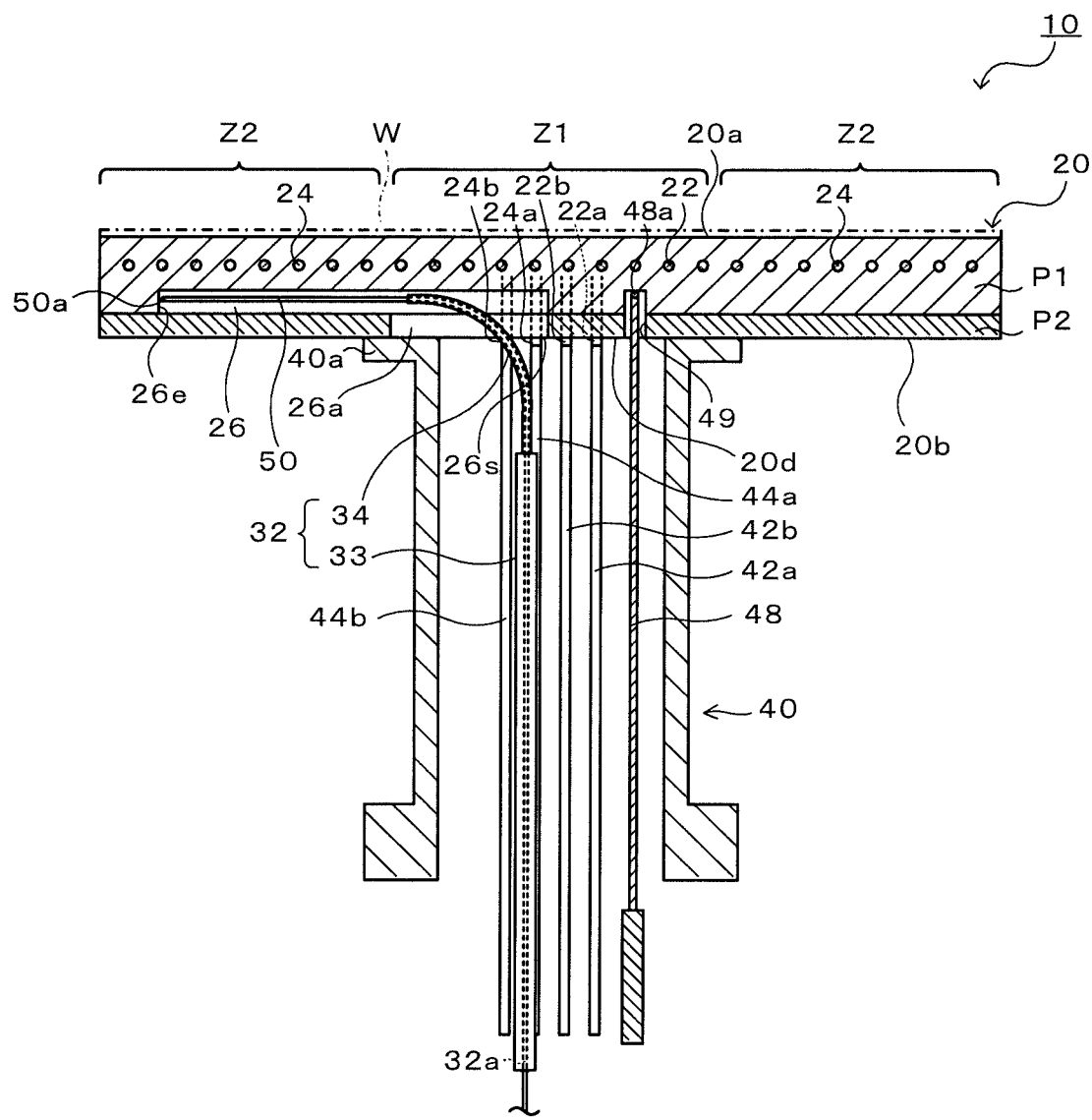
FIG. 2 is a sectional view taken along A-A in FIG. 1.
Figure 3:
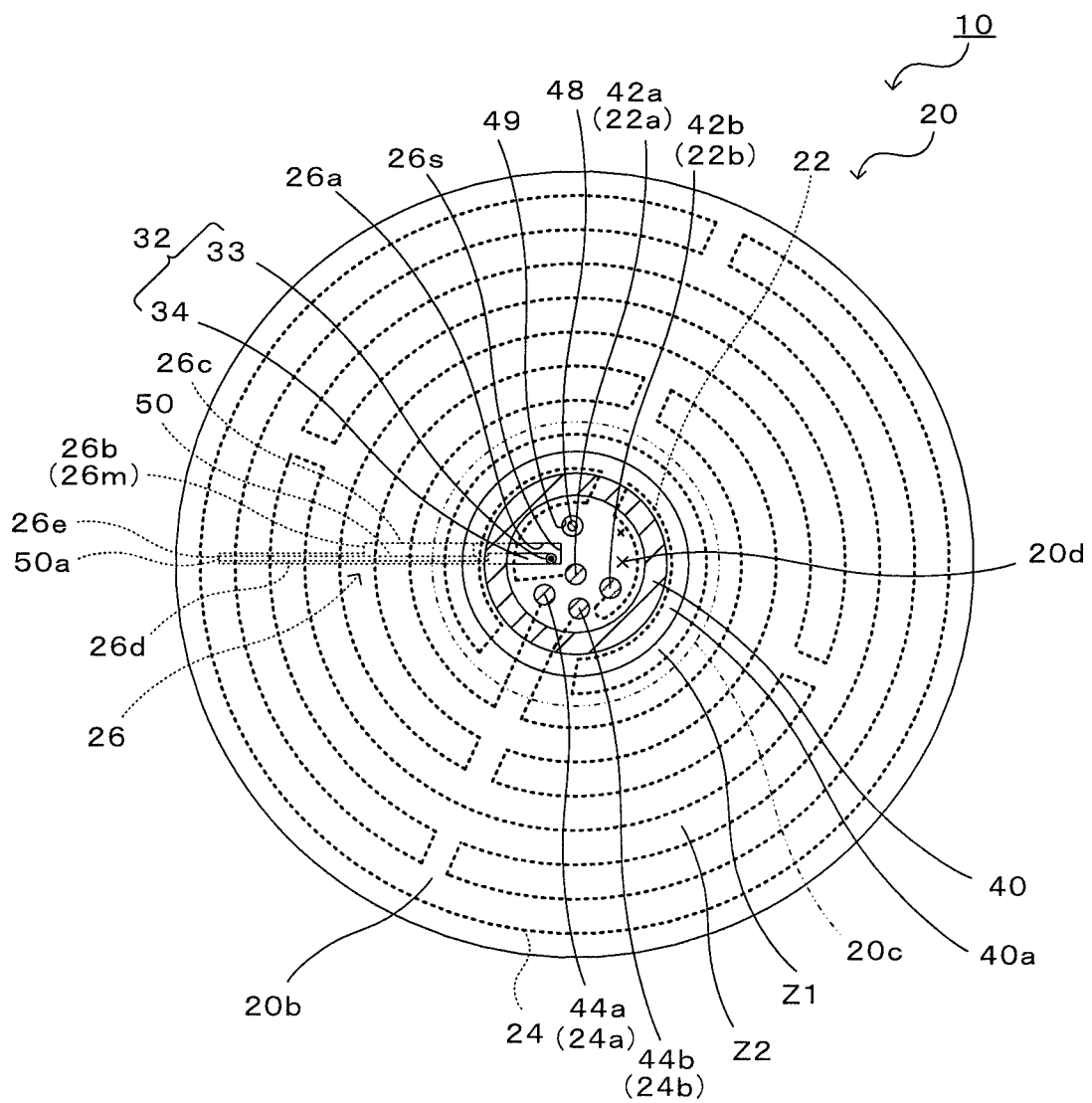
FIG. 3 is a sectional view taken along B-B in FIG. 1.
Figure 4:
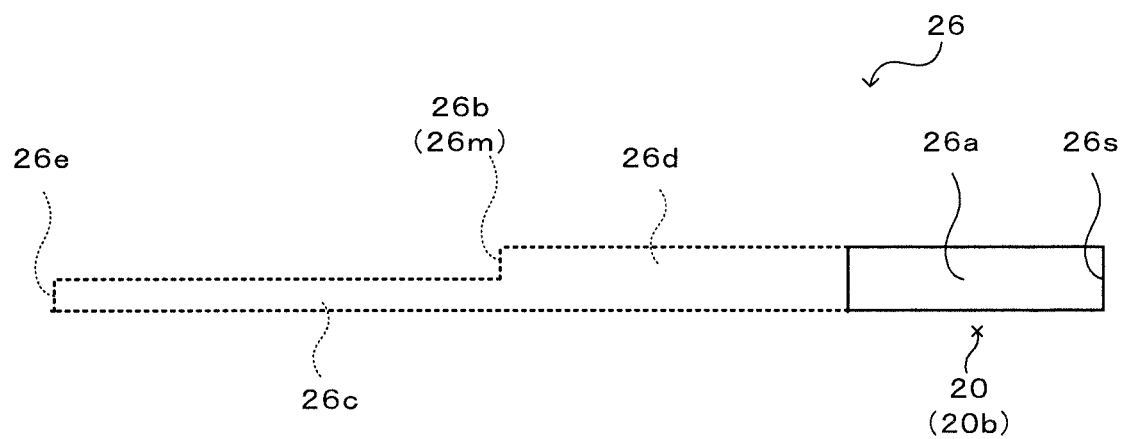
FIG. 4 is a plan view when looking at a thermocouple passage 26 from a rear surface 20b of a ceramic plate 20.
Figure 5:
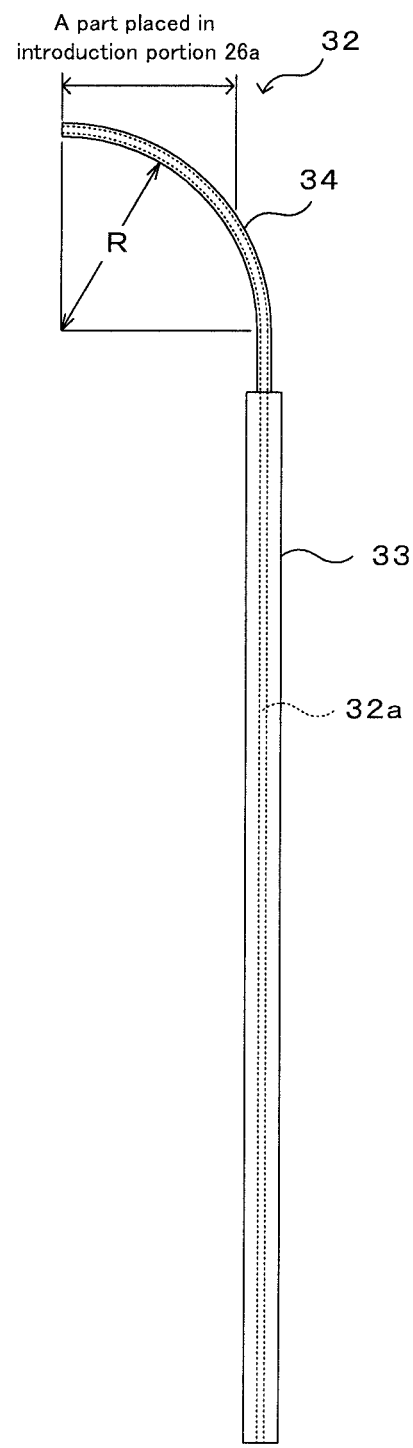
FIG. 5 is a front view of a thermocouple guide 32.
Figure 6:
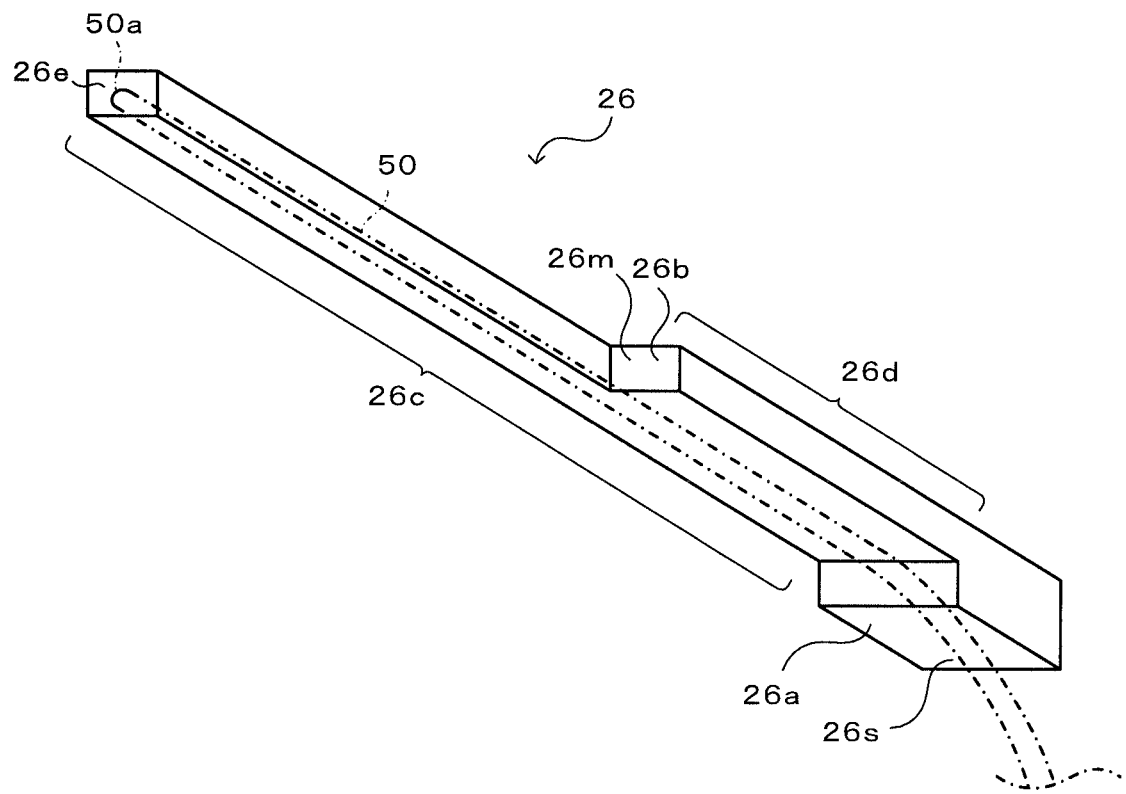
FIG. 6 is a perspective view when looking at the thermocouple passage 26 from a location obliquely below the ceramic plate 20.
Figure 7:
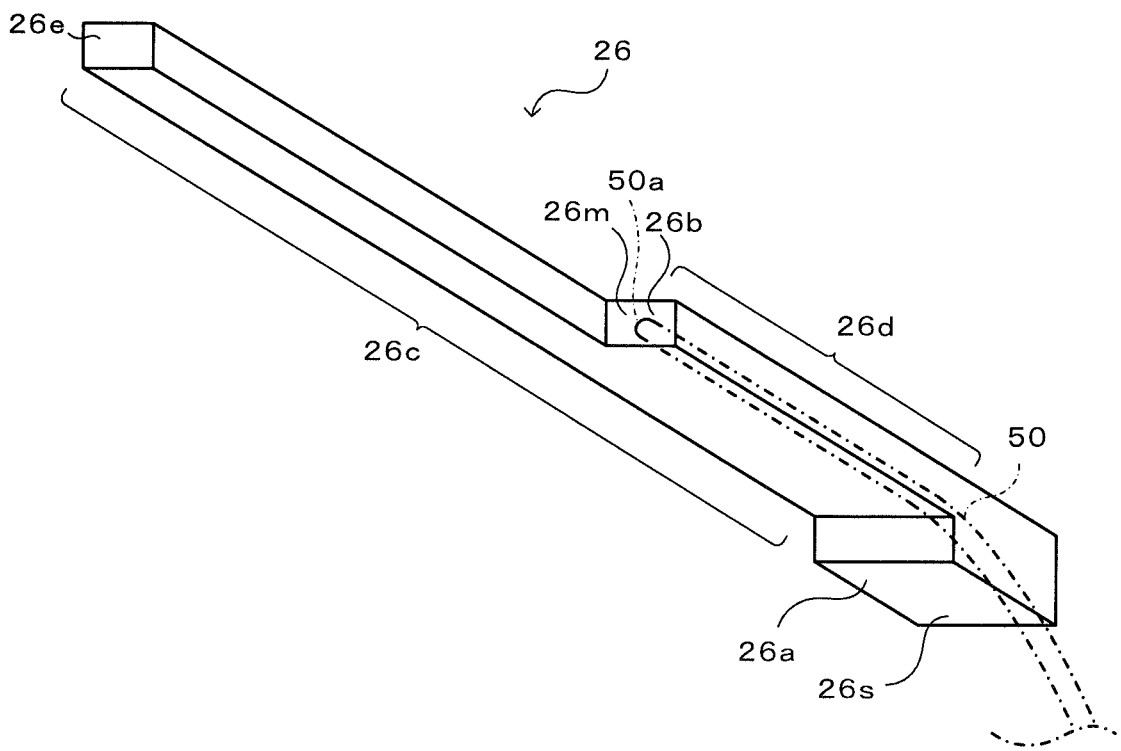
FIG. 7 is a perspective view when looking at the thermocouple passage 26 from a location obliquely below the ceramic plate 20.

Preferred embodiments of the present invention will be described below with reference to the drawings. FIG. 1 is a perspective view of a ceramic heater 10, FIG. 2 is a sectional view taken along A-A in FIG. 1, FIG. 3 is a sectional view taken along B-B in FIG. 1, FIG. 4 is a plan view when looking at a thermocouple passage 26 from a rear surface 20b of a ceramic plate 20, FIG. 5 is a front view of a thermocouple guide 32 and FIGS. 6 and 7 are each a perspective view when looking at the thermocouple passage 26 from a location obliquely below the ceramic plate 20.

The ceramic heater 10 is used to heat a wafer W on which processing, such as etching or CVD, is to be performed, and is installed within a vacuum chamber (not illustrated). The ceramic heater 10 includes a disk-shaped ceramic plate 20 having a wafer placement surface 20a, and a tubular shaft 40 that is bonded to a surface (rear surface) 20b of the ceramic plate 20 opposite to the wafer placement surface 20a.

The ceramic plate 20 is a disk-shaped plate made of a ceramic material represented by aluminum nitride or alumina. The diameter of the ceramic plate 20 is not limited to a particular value and may be about 300 mm, for example. The ceramic plate 20 is divided into an inner-peripheral-side zone Z1 of a small circular shape and an outer-peripheral-side zone Z2 of an annular shape by a virtual boundary 20c (see FIG. 3) concentric to the ceramic plate 20. An inner-peripheral-side resistance heating element 22 is embedded in the inner-peripheral-side zone Z1 of the ceramic plate 20, and an outer-peripheral-side resistance heating element 24 is embedded in the outer-peripheral-side zone Z2. The resistance heating elements 22 and 24 are each constituted by a coil containing, as a main component, molybdenum, tungsten, or tungsten carbide, for example. As illustrated in FIG. 2, the ceramic plate 20 is fabricated by surface-bonding an upper plate P1 and a lower plate P2 thinner than the upper plate P1.

The tubular shaft 40 is made of a ceramic material, such as aluminum nitride or alumina, like the ceramic plate 20. A flange portion 40a at an upper end of the tubular shaft 40 is bonded to the ceramic plate 20 by diffusion bonding.

As illustrated in FIG. 3, the inner-peripheral-side resistance heating element 22 is formed such that it starts from one of a pair of terminals 22a and 22b and reaches the other of the pair of terminals 22a and 22b after being wired in a one-stroke pattern over substantially the entirety of the inner-peripheral-side zone Z1 while being folded at a plurality of turn-around points. The pair of terminals 22a and 22b are disposed in a within-shaft region 20d (that is defined as a region of the rear surface 20b of the ceramic plate 20, the region locating within the tubular shaft 40). Power feeder rods 42a and 42b each made of a metal (for example, Ni) are bonded respectively to the pair of terminals 22a and 22b.

As illustrated in FIG. 3, the outer-peripheral-side resistance heating element 24 is formed such that it starts from one of a pair of terminals 24a and 24b and reaches the other of the pair of terminals 24a and 24b after being wired in a one-stroke pattern over substantially the entirety of the outer-peripheral-side zone Z2 while being folded at a plurality of turn-around points. The pair of terminals 24a and 24b are disposed in the within-shaft region 20d of the rear surface 20b of the ceramic plate 20. Power feeder rods 44a and 44b each made of a metal (for example, Ni) are bonded respectively to the pair of terminals 24a and 24b.

Inside the ceramic plate 20, as illustrated in FIG. 2, the thermocouple passage 26 in the form of an elongate hole into which an outer-peripheral-side thermocouple 50 is to be inserted is formed parallel to the wafer placement surface 20a. As illustrated in FIG. 3, the thermocouple passage 26 extends linearly from a start point 26s in the within-shaft region 20d of the rear surface 20b of the ceramic plate 20 toward an outer peripheral portion of the ceramic plate 20. An entry portion of the thermocouple passage 26 extending from the start point 26s to the flange portion 40a is an introduction portion 26a in the form of an elongate groove into which a tip end of a curved portion 34 of the thermocouple guide 32 is to be fitted. The introduction portion 26a is opened to the within-shaft region 20d. As illustrated in FIGS. 3, 4, 6 and 7, the thermocouple passage 26 includes a stepped portion 26b provided at an intermediate position 26m between the start point 26a and a terminal end position 26e, a long-distance portion 26c extending from the start position 26s to the terminal end position 26e, and a short-distance portion 26d extending from the start position 26s to the intermediate position 26m. The stepped portion 26b is provided as a step formed to lie in the planar direction of the ceramic plate 20. The long-distance portion 26c and the short-distance portion 26d are each a linear passage and are provided such that a wide passage is defined by both the long-distance portion 26c and the short-distance portion 26d together over a range from the start position 26s to the intermediate position 26m, and that a narrow passage is defined only by the long-distance portion 26c over a range from the intermediate position 26m to the terminal end position 26e.

As illustrated in FIG. 5, the thermocouple guide 32 is a tubular member made of a metal (for example, stainless) and having a guide hole 32a. The thermocouple guide 32 includes a vertical portion 33 extending in a vertical direction with respect to the wafer placement surface 20a, and a curved portion 34 extending while turning from the vertical direction to a horizontal direction. An outer diameter of the vertical portion 33 is greater than that of the curved portion 34, but an inner diameter of the vertical portion 33 is the same as that of the curved portion 34. Because the outer diameter of the curved portion 34 is relatively small as mentioned above, a width of the introduction portion 26a of the thermocouple passage 26 through which the curved portion 34 is inserted can be reduced. Alternatively, the outer diameter of the vertical portion 33 may be set to be the same as that of the curved portion 34. A curvature radius R of the curved portion 34 is not limited to a particular value and may be about 30 mm, for example. The outer-peripheral-side thermocouple 50 is inserted through the guide hole 32a of the thermocouple guide 32. The tip end of the curved portion 34 may be simply fitted into the introduction portion 26a or may be firmly held in the introduction portion 26a by joining or bonding.

Inside the tubular shaft 40, as illustrated in FIG. 2, there are arranged not only the thermocouple guide 32, but also the power feeder rods 42a and 42b connected respectively to the pair of terminals 22a and 22b of the inner-peripheral-side resistance heating element 22, and the power feeder rods 44a and 44b connected respectively to the pair of terminals 24a and 24b of the outer-peripheral-side resistance heating element 24. In addition, an inner-peripheral-side thermocouple 48 for measuring a temperature near the center of the ceramic plate 20 and the outer-peripheral-side thermocouple 50 for measuring a temperature near the outer periphery of the ceramic plate 20 are also arranged inside the tubular shaft 40. The inner-peripheral-side thermocouple 48 is inserted into a recess 49 formed in the within-shaft region 20d of the ceramic plate 20, and a temperature measurement portion 48a at a tip end of the inner-peripheral-side thermocouple 48 is held in contact with the ceramic plate 20. The recess 49 is formed at a position not interfering with the terminals 22a, 22b, 24a and 24b and the introduction portion 26a of the thermocouple passage 26. The outer-peripheral-side thermocouple 50 is a sheathed thermocouple and is arranged to pass through the guide hole 32a of the thermocouple guide 32 and the thermocouple passage 26. A temperature measurement portion 50a at a tip end of the outer-peripheral-side thermocouple 50 may be arranged to pass through the long-distance portion 26c and to come into contact with the terminal end position 26e (see FIGS. 3 and 6), or may be arranged to pass through the short-distance portion 26d and to come into contact with the stepped portion 26b at the intermediate position 26m (see FIG. 7). Alternatively, two outer-peripheral-side thermocouples 50 may be inserted into the long-distance portion 26c and the short-distance portion 26d in a one-to-one relation such that the temperature measurement portion 50a of one of the two outer-peripheral-side thermocouples 50 comes into contact with the terminal end position 26e, and that the temperature measurement portion 50a of the other outer-peripheral-side thermocouple 50 comes into contact with the stepped portion 26b.

An example of use of the ceramic heater 10 will be described below. First, the ceramic heater 10 is installed within a vacuum chamber (not illustrated), and the wafer W is placed on the wafer placement surface 20a of the ceramic heater 10. Then, electric power supplied to the inner-peripheral-side resistance heating element 22 is adjusted such that the temperature detected by the inner-peripheral-side thermocouple 48 is kept at a predetermined inner-peripheral-side target temperature. Furthermore, electric power supplied to the outer-peripheral-side resistance heating element 24 is adjusted such that the temperature detected by the outer-peripheral-side thermocouple 50 is kept at a predetermined outer-peripheral-side target temperature. Thus the temperature of the wafer W is controlled to be kept at a desired temperature. Thereafter, the interior of the vacuum chamber is evacuated to create a vacuum atmosphere or a pressure reduced atmosphere, plasma is generated inside the vacuum chamber, and CVD film formation or etching is performed on the wafer W by utilizing the generated plasma.

With the above-described ceramic heater 10 according to this embodiment, the temperature at the terminal end position 26e can be accurately measured by inserting the outer-peripheral-side thermocouple 50 into the long-distance portion 26c of the thermocouple passage 26 and arranging the temperature measurement portion 50a of the outer-peripheral-side thermocouple 50 to be held in contact with the terminal end position 26e. Moreover, the temperature at the intermediate position 26m can be accurately measured by inserting the outer-peripheral-side thermocouple 50 into the short-distance portion 26d of the thermocouple passage 26 and arranging the temperature measurement portion 50a of the outer-peripheral-side thermocouple 50 to be held in contact with the stepped portion 26b at the intermediate position 26m. It is hence possible to increase a degree of freedom in position of the temperature measurement and to improve the accuracy of the temperature measurement at each position of the temperature measurement.

In addition, the stepped portion 26b is provided as the step formed to lie in the planar direction of the ceramic plate 20. Therefore, when the outer-peripheral-side thermocouple 50 is inserted along one side surface of the thermocouple passage 26, the temperature measurement portion 50a of the outer-peripheral-side thermocouple 50 can be brought into contact with the terminal end position 26e (see FIG. 6). When the outer-peripheral-side thermocouple 50 is inserted along the other side surface of the thermocouple passage 26, the temperature measurement portion 50a of the outer-peripheral-side thermocouple 50 can be brought into contact with the stepped portion 26b at the intermediate position 26m (see FIG. 7).

It is needless to say that the present invention is not limited to the above-described embodiment and the present invention can be implemented in various forms insofar as not departing from the technical scope of the present invention.

Figure 8:
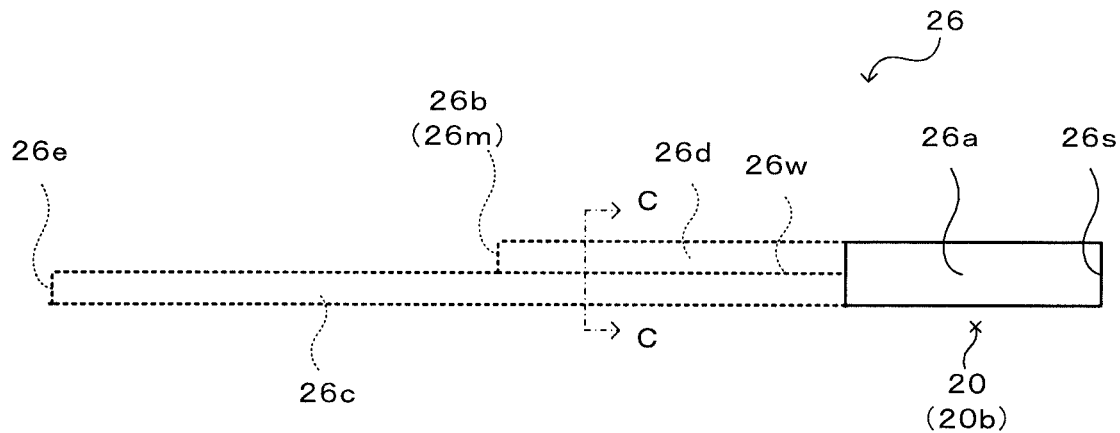
FIG. 8 is a plan view when looking at a modification of the thermocouple passage 26 from the rear surface 20b of the ceramic plate 20.
Figure 9:
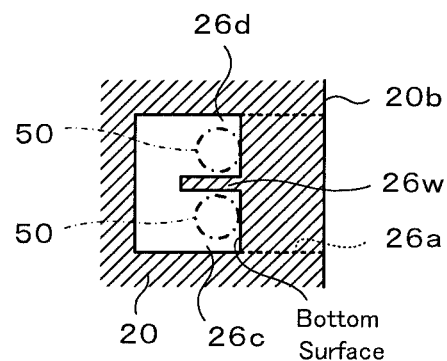
FIG. 9 is a sectional view taken along C-C in FIG. 8.
Figure 10:
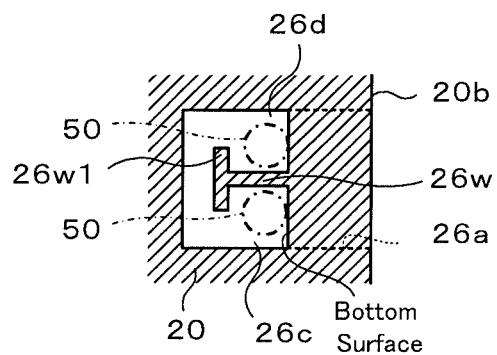
FIG. 10 is a sectional view taken along C-C in FIG. 8.

For example, as illustrated in FIGS. 8 and 9, the above-described embodiment may include a partition wall 26w that is provided to extend along the boundary between the short-distance portion 26d and the long-distance portion 26c of the thermocouple passage 26. In this case, the outer-peripheral-side thermocouple 50 can be guided to the terminal end position 26e or the stepped portion 26b with the aid of the partition wall 26w. Furthermore, the outer-peripheral-side thermocouple 50 inserted into the long-distance portion 26c (or the short-distance portion 26d) can be prevented from accidentally coming to the short-distance portion 26d (or the long-distance portion 26c). From the viewpoint of avoiding such an accident in the insertion of the outer-peripheral-side thermocouple 50, the height of the partition wall 26w is preferably equal to or more than the radius of the outer-peripheral-side thermocouple 50. The partition wall 26w may be provided along the entirety or part of the above-mentioned boundary. Alternatively, as illustrated in FIG. 10, the partition wall 26w may include an overhang portion 26w1 formed at an upper end. The overhang portion 26w1 can more reliably avoid the above-mentioned accident in the insertion of the outer-peripheral-side thermocouple 50.

Figure 11:
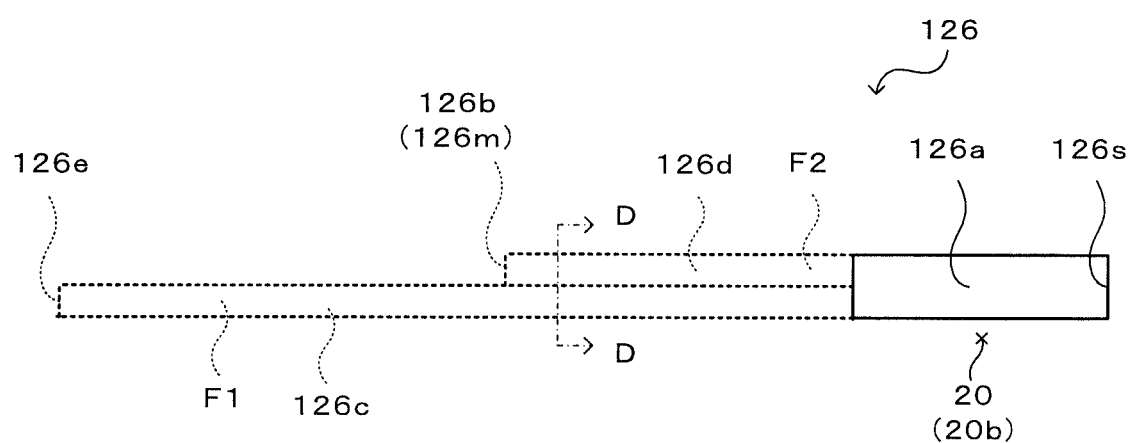
FIG. 11 is a plan view when looking at a thermocouple passage 126 from the rear surface 20b of the ceramic plate 20.
Figure 12:
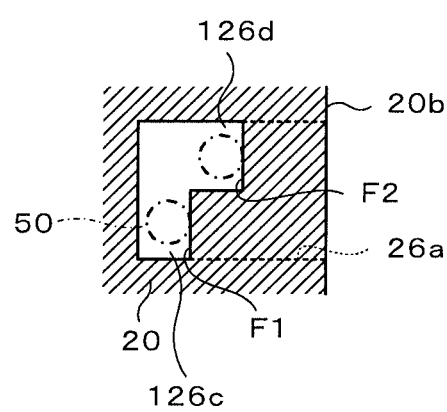
FIG. 12 is a sectional view taken along D-D in FIG. 11.

A thermocouple passage 126 illustrated in FIGS. 11 and 12 may be used instead of the thermocouple passage 26 in the above-described embodiment. The thermocouple passage 126 is basically similar to the thermocouple passage 26 except for that a stepped portion 126b is provided at an intermediate position 126m by forming a bottom surface F2 of a short-distance portion 126d at a level lower than a bottom surface F1 of a long-distance portion 126c by one step. Thus the stepped portion 126b has a step in each of the planar direction and the thickness direction of the ceramic plate 20. Also in this case, the outer-peripheral-side thermocouple 50 can be inserted into the long-distance portion 126c of the thermocouple passage 126 to bring the temperature measurement portion 50a of the outer-peripheral-side thermocouple 50 into contact with the terminal end position 126e, or can be inserted into the short-distance portion 126d to bring the temperature measurement portion 50a of the outer-peripheral-side thermocouple 50 into contact with the stepped portion 126b at the intermediate position 126m. More specifically, when the outer-peripheral-side thermocouple 50 is inserted along an upper step surface (the bottom surface F1) of the thermocouple passage 126, the temperature measurement portion 50a can be brought into contact with the terminal end position 126e. When the outer-peripheral-side thermocouple 50 is inserted along a lower step surface (the bottom surface F2) of the thermocouple passage 126, the temperature measurement portion 50a can be brought into contact with the stepped portion 126b. The bottom surface F2 of the short-distance portion 126d may be formed as a slope moderately inclining from an introduction portion 126a toward the intermediate position 126m. In addition, the partition wall 26w illustrated in FIGS. 8 to 10 may be provided at the boundary between the long-distance portion 126c and the short-distance portion 126d.

Figure 13:
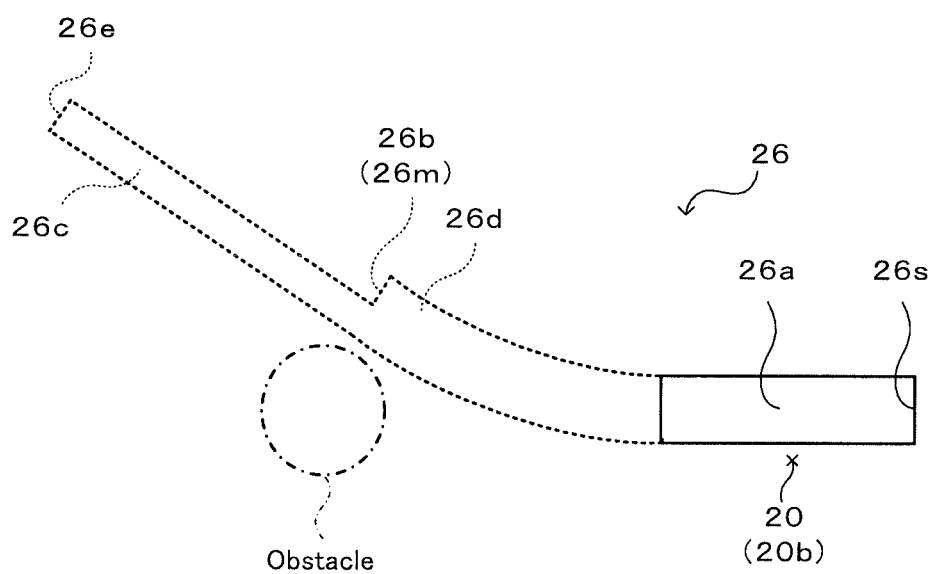
FIG. 13 is a plan view when looking at a modification of the thermocouple passage 26 from the rear surface 20b of the ceramic plate 20.
Figure 14:
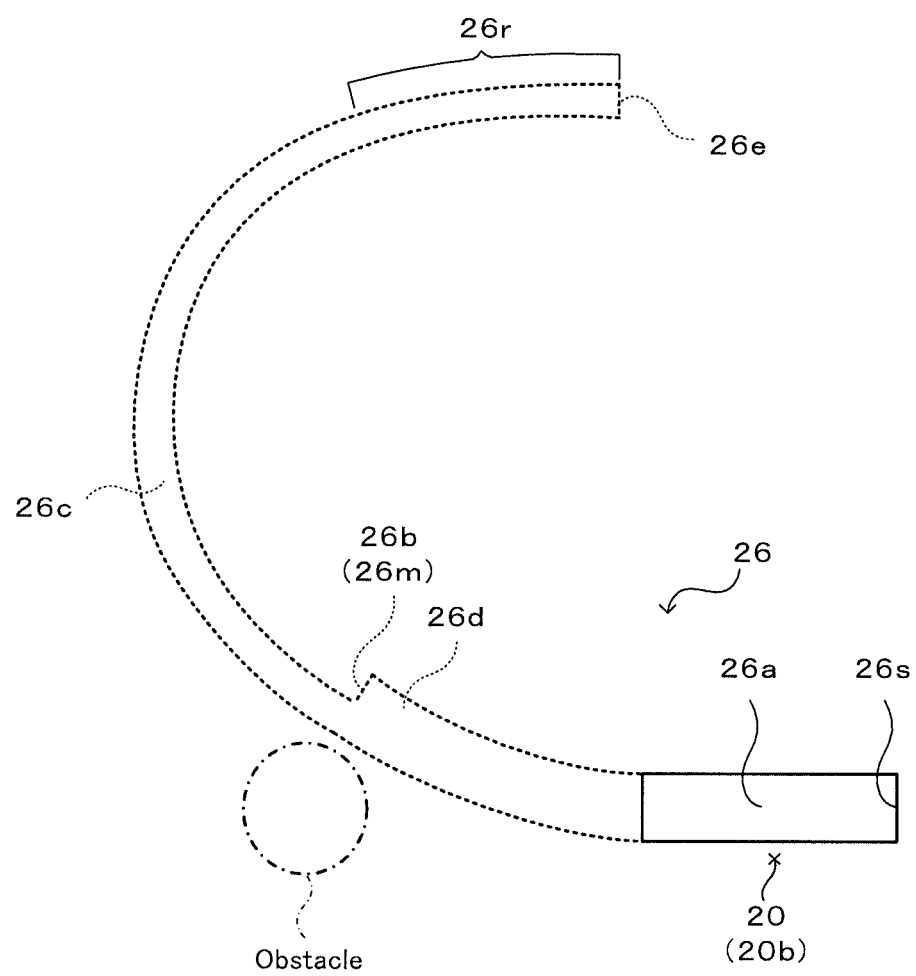
FIG. 14 is a plan view when looking at a modification of the thermocouple passage 26 from the rear surface 20b of the ceramic plate 20.

In the above-described embodiment, as illustrated in FIG. 13, the thermocouple passage 26 may be formed in a curved shape when viewing the ceramic plate 20 in plan. In FIG. 13, the stepped portion 26b is provided on an inner peripheral side of the thermocouple passage 26. With this modification, when an obstacle, such as a through-hole, is present in the ceramic plate 20, the thermocouple passage 26 can be formed while avoiding the obstacle. The long-distance portion 26c of the thermocouple passage 26 in such a case may be curved, as illustrated in FIG. 14, to have a curved portion 26r along a circle (circumference) concentric to the ceramic plate 20 when viewing the ceramic plate 20 in plan. The curved portion 26r extending along the circumference enables a plurality of thermocouples to be arranged along the circumferential direction. It is hence possible to reduce the number of grooves for thermocouples, the grooves extending from a central portion toward the outer periphery, to improve uniformity in heating, and to increase a degree of freedom in design for an inner space of the shaft.

While, in the above-described embodiment, the terminal end position 26e and the intermediate position 26m are both disposed in the outer-peripheral-side zone Z2, the terminal end position 26e may be disposed in the outer-peripheral-side zone Z2, and the intermediate position 26m may be disposed in the inner-peripheral-side zone Z1. With such an arrangement, in the so-called two-zone heater, temperatures in different zones can be accurately measured using the single thermocouple passage 26. The inner-peripheral-side thermocouple 48 may be omitted depending on the cases.

Figure 15:
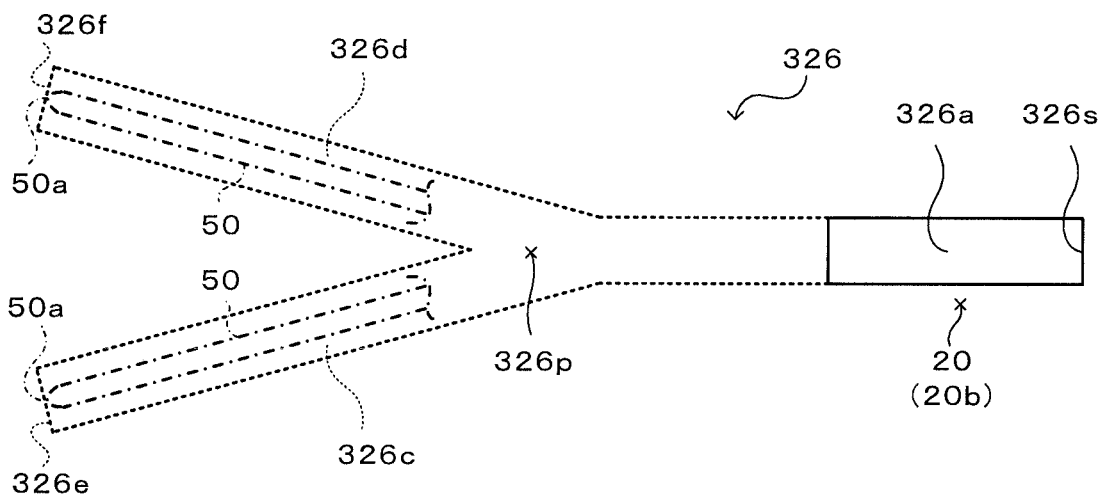
FIG. 15 is a plan view when looking at a thermocouple passage 326 from the rear surface 20b of the ceramic plate 20.

A thermocouple passage 326 illustrated in FIG. 15 may be used instead of the thermocouple passage 26 in the above-described embodiment. The thermocouple passage 326 is a passage extending from a start point 326s toward the outer periphery of the ceramic plate 20. The thermocouple passage 326 includes a branch point 326p at a midway position, a first branch passage 326c extending from the branch point 326p to a first terminal end position 326e, and a second branch passage 326d extending from the branch point 326p to a second terminal end position 326f that is different from the first terminal end position 326e. A length from the center of the ceramic plate 20 to the second terminal end position 326f is equal to that from the center of the ceramic plate 20 to the first terminal end position 326e. The thermocouple passage 326 includes an introduction portion 326a that is similar to the introduction portion 26a. With the thermocouple passage 326, the temperature at the first terminal end position 326e can be accurately measured by inserting the outer-peripheral-side thermocouple 50 into the first branch passage 326c and arranging the temperature measurement portion 50a to be brought into contact with the first terminal end position 326e. Furthermore, the temperature at the second terminal end position 326f can be accurately measured by inserting the outer-peripheral-side thermocouple 50 into the second branch passage 326d and arranging the temperature measurement portion 50a to be brought into contact with the second terminal end position 326f. It is hence possible to increase a degree of freedom in position of the temperature measurement and to improve the accuracy of the temperature measurement at each position of the temperature measurement. In addition, temperatures at two different points with different distances from the center of the ceramic plate 20 can be measured. The thermocouple passage 326 may be branched from the branch point 326p into three or more branch passages.

Figure 16:
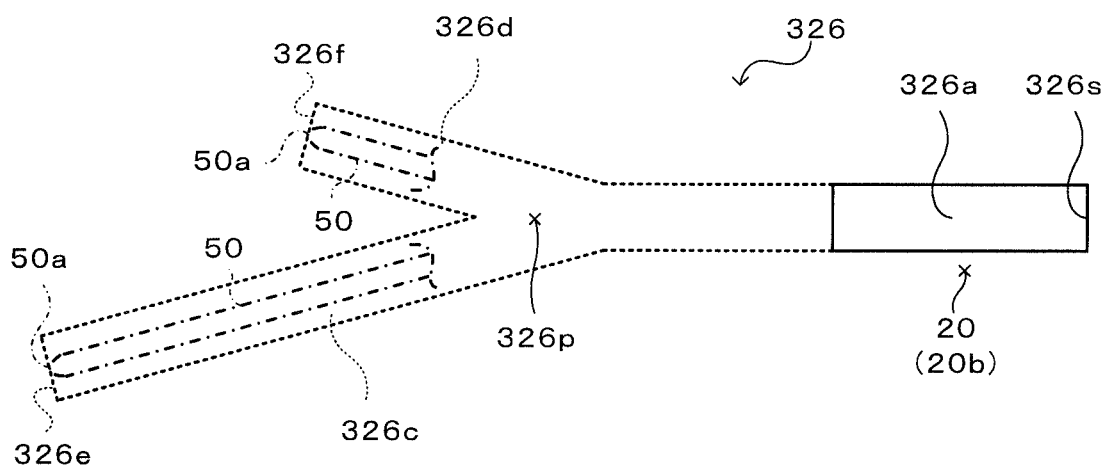
FIG. 16 is a plan view when looking at a modification of the thermocouple passage 326 from the rear surface 20b of the ceramic plate 20.

In the above-described thermocouple passage 326, as illustrated in FIG. 16, the length from the center of the ceramic plate 20 to the second terminal end position 326f may be set different from that from the center of the ceramic plate 20 to the first terminal end position 326e. In this case, temperatures at two points with different distances from the center of the ceramic plate 20 can be measured.

Figure 17:
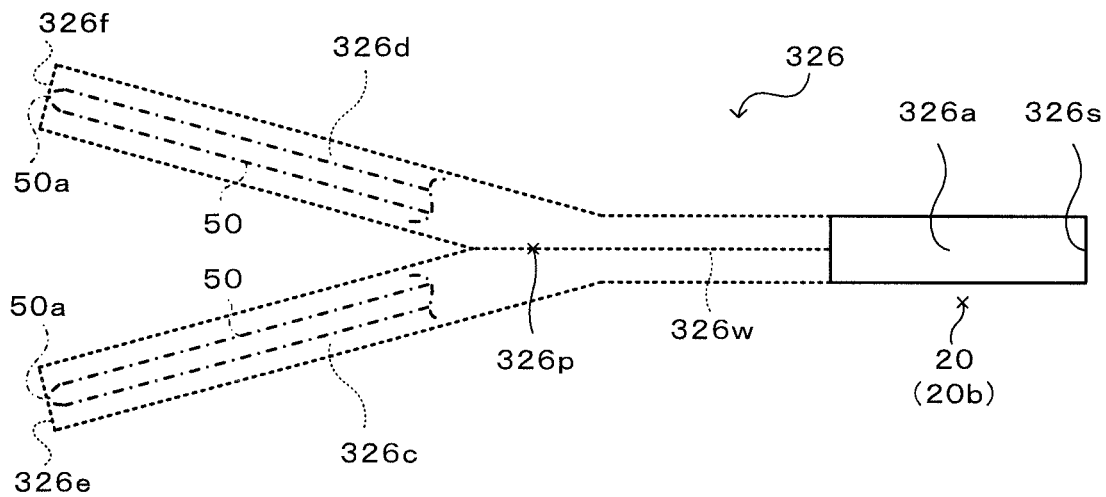
FIG. 17 is a plan view when looking at a modification of the thermocouple passage 326 from the rear surface 20b of the ceramic plate 20.

As illustrated in FIG. 17, the thermocouple passage 326 may include a partition wall 326w between the introduction portion 326a and the branch point 326p. In this case, the outer-peripheral-side thermocouple 50 can be guided to the first terminal end position 326e or the second terminal end position 326f with the aid of the partition wall 326w. A cross-section of the partition wall 326w may have the same shape as that of the partition wall 26w in FIG. 9, or the same shape as that of the partition wall 26w in FIG. 10.

Figure 18:
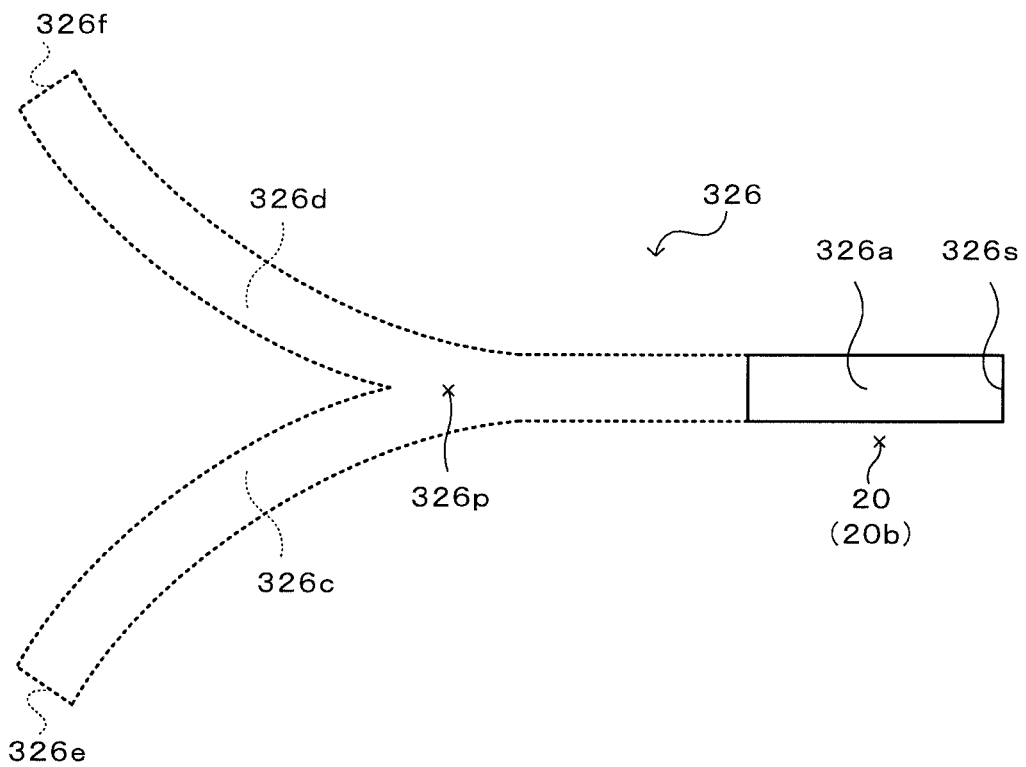
FIG. 18 is a plan view when looking at a modification of the thermocouple passage 326 from the rear surface 20b of the ceramic plate 20.
Figure 19:
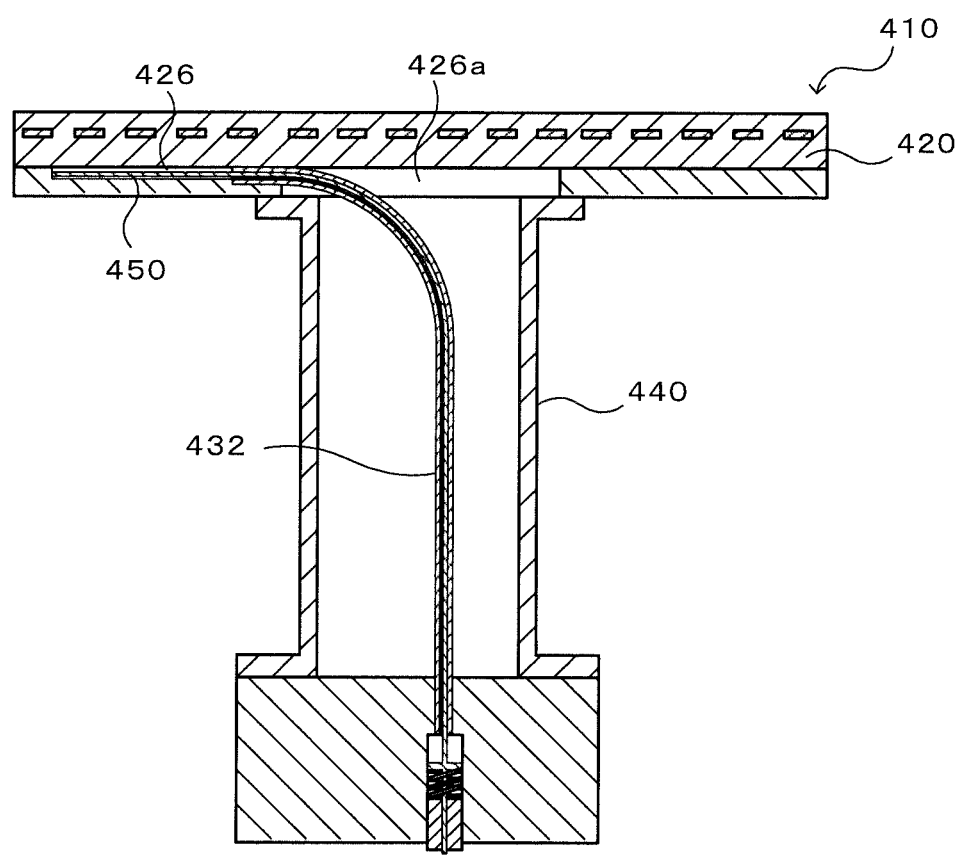
FIG. 19 is an explanatory view of a related-art ceramic heater.

In the thermocouple passage 326, as illustrated in FIG. 18, the first branch passage 326c and the second branch passage 326d may be each formed in a curved shape when viewing the ceramic plate 20 in plan. With this modification, when an obstacle, such as a through-hole, is present in the ceramic plate 20, the thermocouple passage 326 can be formed while avoiding the obstacle. In FIG. 18, one of the first branch passage 326c and the second branch passage 326d may be curved and the other may be linear.

While FIGS. 15 to 18 illustrate the case in which the thermocouple passage 326 is branched into a Y-like shape, the thermocouple passage 326 may be branched into a T-like or λ-like shape.

The thermocouple passage 326 may be formed such that the first terminal end position 326e and the second terminal end position 326f are both disposed in the outer-peripheral-side zone Z2, or that the first terminal end position 326e is disposed in the outer-peripheral-side zone Z2 and the second terminal end position 326f is disposed in the inner-peripheral-side zone Z1. In the latter case, in the so-called two-zone heater, temperatures in different zones can be accurately measured using the single thermocouple passage 326. The inner-peripheral-side thermocouple 48 may be omitted depending on the cases. When a plurality of thermocouples are inserted into the thermocouple passage 326, those thermocouples may be each inserted in a sheathed state up to halfway the thermocouple passage 326. This enables the plurality of thermocouples to be inserted into the thermocouple passage 326 at the same time.

While, in the above-described embodiment, the resistance heating elements 22 and 24 are each in the form of a coil, the shape of each resistance heating element is not always limited to the coil. In another example, the resistance heating element may be a print pattern or may have a ribbon-like or mesh-like shape.

In the above-described embodiment, the ceramic plate 20 may incorporate an electrostatic electrode and/or an RF electrode in addition to the resistance heating elements 22 and 24.

While the so-called two-zone heater has been described, by way of example, in the above embodiment, the present invention is not always limited to the two-zone heater. In another example, the inner-peripheral-side zone Z1 may be divided into a plurality of inner-peripheral-side small zones, and the resistance heating element may be wired in a one-stroke pattern for each of the inner-peripheral-side small zones. Furthermore, the outer-peripheral-side zone Z2 may be divided into a plurality of outer-peripheral-side small zones, and the resistance heating element may be wired in a one-stroke pattern for each of the outer-peripheral-side small zones.

While, in the above-described embodiment, the thermocouple guide 32 is attached to the introduction portion 26a of the thermocouple passage 26, it may be used as follows. The thermocouple guide 32 is placed in the introduction portion 26a when the outer-peripheral-side thermocouple 50 is inserted into the thermocouple passage 26, and after inserting the outer-peripheral-side thermocouple 50 into the thermocouple passage 26, the thermocouple guide 32 is removed. Alternatively, the outer-peripheral-side thermocouple 50 may be inserted into the thermocouple passage 26 without using the thermocouple guide 32.

In the above-described embodiment, when the thermocouple passage 26 is formed as a passage having a cross-section of a substantially rectangular shape, the boundary between one surface and another adjacent surface within the passage (for example, the boundary between a bottom surface and a side surface) is preferably formed to define a chamfered surface or a rounded surface to be free from edges.

In the above-described embodiment, an outer diameter d of the outer-peripheral-side thermocouple 50 is preferably 0.5 mm or more and 2 mm or less. If the outer diameter d is less than 0.5 mm, the outer-peripheral-side thermocouple 50 is likely to bend when it is inserted into the thermocouple passage 26, and a difficulty arises in inserting the outer-peripheral-side thermocouple 50 up to the terminal end position 26e or the intermediate position 26m. If the outer diameter d is more than 2 mm, the outer-peripheral-side thermocouple 50 has no flexibility, and a difficulty also arises in inserting the outer-peripheral-side thermocouple 50 up to the terminal end position 26e or the intermediate position 26m.

In the above-described embodiment, when the temperature measurement portion 50a of the outer-peripheral-side thermocouple 50 has a convex surface, the thermocouple passage 26 may be formed, at each of the terminal end position 26e and the stepped portion 26b, to have a concave surface in part of a terminal end surface of the thermocouple passage 26 (part of a vertical wall at the terminal end position 26e) or part of a vertical wall of the stepped portion 26b, the part coming into contact with the temperature measurement portion 50a. In this case, since the temperature measurement portion 50a of the outer-peripheral-side thermocouple 50 is brought into surface contact or nearly surface contact with the concave surface, the accuracy of the temperature measurement can be improved.

The present application claims priority from Japanese Patent Application No. 2020-016112, filed on Feb. 3, 2020, the entire contents of which are incorporated herein by reference.

What is claimed is:

1. A ceramic heater comprising:
a ceramic plate having a surface that serves as a wafer placement surface;
a resistance heating element that is embedded in the ceramic plate;
a tubular shaft that supports the ceramic plate from a rear surface of the ceramic plate; and
a thermocouple passage that extends from a start point in a within-shaft region of the rear surface of the ceramic plate, the within-shaft region being surrounded by the tubular shaft, to a terminal end position in an outer peripheral portion of the ceramic plate,
wherein the thermocouple passage includes a stepped portion provided at an intermediate position between the start point and the terminal end position, a long-distance portion extending from the start position to the terminal end position, and a short-distance portion extending from the start position to the intermediate position, and
wherein the long-distance portion is adapted for inserting and holding a thermocouple in contact with the terminal end position, and the short-distance portion is adapted for inserting and holding a thermocouple in contact with the stepped portion at the intermediate position.

2. The ceramic heater according to claim 1, wherein the stepped portion is provided as a step formed to lie in a planar direction of the ceramic plate.

3. The ceramic heater according to claim 1, wherein the stepped portion is provided as a step formed to lie in a thickness direction of the ceramic plate.

4. The ceramic heater according to claim 1, wherein the thermocouple passage includes a partition wall that is provided in at least part of a boundary between the long-distance portion and the short-distance portion.

5. The ceramic heater according to claim 1, wherein the thermocouple passage is curved when viewing the ceramic plate in plan.

6. The ceramic heater according to claim 1, wherein the resistance heating element is wired for each of a plurality of zones that are obtained by dividing the wafer placement surface, and
the terminal end position and the intermediate position are located in different ones of the plurality of zones.

7. A ceramic heater comprising:
a ceramic plate having a surface that serves as a wafer placement surface;
a resistance heating element that is embedded in the ceramic plate;
a tubular shaft that supports the ceramic plate from a rear surface of the ceramic plate; and
a thermocouple passage that extends from a start point in a within-shaft region of the rear surface of the ceramic plate, the within-shaft region being surrounded by the tubular shaft, toward an outer peripheral portion of the ceramic plate,
wherein the thermocouple passage includes a branch point at a midway position, a first branch passage extending from the branch point to a first terminal end position, and a second branch passage extending from the branch point to a second terminal end position that is different from the first terminal end position.

8. The ceramic heater according to claim 7, wherein a length from a center of the ceramic plate to the second terminal end position is equal to or different from a length from the center of the ceramic plate to the first terminal end position.

9. The ceramic heater according to claim 7, wherein the thermocouple passage includes a partition wall that is provided in at least part of the thermocouple passage between the start point and the branch point.

10. The ceramic heater according to claim 7, wherein at least one of the first branch passage and the second branch passage of the thermocouple passage is curved when viewing the ceramic plate in plan.

11. The ceramic heater according to claim 7, wherein the resistance heating element is wired for each of a plurality of zones that are obtained by dividing the wafer placement surface, and the first terminal end position and the second terminal end position are located in different ones of the plurality of zones.

12. The ceramic heater according to claim 7, wherein the first branch is adapted for inserting and holding a thermocouple in contact with the first terminal end position and the second branch is adapted for inserting and holding a thermocouple in contact with the second terminal end position.

13. The ceramic heater according to claim 7, wherein the branch point is a Y-like shape, a T-like shape or a λ-like shape.

\* \* \* \* \*